(12) United States Patent
Mulligan et al.

(10) Patent No.: US 7,561,394 B2
(45) Date of Patent: Jul. 14, 2009

(54) SYSTEM AND METHOD FOR OVERVOLTAGE PROTECTION

(75) Inventors: David R. Mulligan, Livonia, MI (US); Ira C. Miller, Jr., Dearborn Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/953,482

(22) Filed: Dec. 10, 2007

(65) Prior Publication Data

US 2009/0147423 A1   Jun. 11, 2009

(51) Int. Cl.
H02H 3/20 (2006.01)
H02H 9/04 (2006.01)
H02H 9/00 (2006.01)
H02H 7/00 (2006.01)

(52) U.S. Cl. .................. 361/91.1; 361/18; 361/54; 361/56; 361/111

(58) Field of Classification Search ............... 361/91.1, 361/56, 111, 54, 18
See application file for complete search history.

(56) References Cited

U.S. PATENT DOCUMENTS

| | | | |
|---|---|---|---|
| 4,005,342 A | 1/1977 | Davis | |
| 4,306,270 A | 12/1981 | Miller et al. | |
| 4,459,631 A | 7/1984 | McNamee | |
| 4,670,705 A | 6/1987 | Sievers et al. | |
| 5,309,309 A * | 5/1994 | Weber | 361/18 |
| 5,463,521 A | 10/1995 | Love | |
| 5,585,991 A | 12/1996 | Williams | |
| 6,650,521 B2 | 11/2003 | Dubhashi et al. | |
| 6,700,765 B2 | 3/2004 | Ely | |
| 6,738,245 B2 | 5/2004 | Ely | |
| 6,882,513 B2 | 4/2005 | Laraia | |
| 2006/0001401 A1* | 1/2006 | Krieger et al. | 320/128 |
| 2006/0087778 A1 | 4/2006 | Hau et al. | |
| 2007/0210757 A1* | 9/2007 | Gangstoe et al. | 320/130 |

\* cited by examiner

*Primary Examiner*—Albert W Paladini
*Assistant Examiner*—Dharti H Patel
(74) *Attorney, Agent, or Firm*—Dickinson Wright PLLC (57) ABSTRACT

An overvoltage protection system and method including a control circuit and a bank of resistors to absorb the energy from a transient voltage without exceeding an allowed temperature for the resistors. The resistors in the bank are independently switched and configured such that upon detection of an overvoltage condition a combination of the resistors is switched into the circuit to dissipate energy. The resistance introduced by the combination of resistors prevents the voltage from rising to an unacceptable level that may damage the circuit being protected. As time progresses, the control circuit alters the combination of resistors in the bank of resistors so as to increase the effective load resistance value, thereby decreasing a load current.

9 Claims, 7 Drawing Sheets

| Count | Resistor and Switch States | | | | Resistance (ohms) | Divider Ratio | Output Voltage (@200V) | Current (A@200V) |
|---|---|---|---|---|---|---|---|---|
| | 1 ohm | 2 ohm | 4 ohm | 8 ohm | | | | |
| 0 | On | On | On | On | 0.533 | 21.05% | 42.1 | 375 |
| 1 | On | On | On | Off | 0.571 | 22.22% | 44.4 | 350 |
| 2 | On | On | Off | On | 0.615 | 23.53% | 47.1 | 325 |
| 3 | On | On | Off | Off | 0.667 | 25.00% | 50.0 | 300 |
| 4 | On | Off | On | On | 0.727 | 26.67% | 53.3 | 275 |
| 5 | On | Off | On | Off | 0.800 | 28.57% | 57.1 | 250 |
| 6 | On | Off | Off | On | 0.889 | 30.77% | 61.5 | 225 |
| 7 | On | Off | Off | Off | 1.000 | 33.33% | 66.7 | 200 |
| 8 | Off | On | On | On | 1.143 | 36.36% | 72.7 | 175 |
| 9 | Off | On | On | Off | 1.333 | 40.00% | 80.0 | 150 |
| 10 | Off | On | Off | On | 1.600 | 44.44% | 88.9 | 125 |
| 11 | Off | On | Off | Off | 2.000 | 50.00% | 100.0 | 100 |
| 12 | Off | Off | On | On | 2.667 | 57.14% | 114.3 | 75 |
| 13 | Off | Off | On | Off | 4.000 | 66.67% | 133.3 | 50 |
| 14 | Off | Off | Off | On | 8.000 | 80.00% | 160.0 | 25 |
| 15 | Off | Off | Off | Off | Infinite | 100.00% | 200.0 | 0 |

SYSTEM AND METHOD FOR OVERVOLTAGE PROTECTION

TECHNICAL FIELD

The present invention relates generally to electrical power protection circuits and more particularly to overvoltage protection circuits.

BACKGROUND OF THE INVENTION

Protection circuits are commonly used to protect electrical circuitry from exposure to transient surges of excessive voltages, known as overvoltage conditions. Overvoltage conditions occur when the voltage exceeds a particular circuit design capability. Overvoltage conditions may ultimately damage or destroy electrical components which is highly undesirable in any circuit design.

An environment in which overvoltage may occur is a battery bus system for an automotive vehicle. In certain conditions, the vehicle's battery bus system voltage will peak above its normal range, commonly referred to as "load dump". Without adequate protection, load dump can permanently damage the vehicle's electronic modules. For example, load dump may occur when jump-starting a vehicle. More specifically, the voltage may increase to a voltage that is many times the normal battery voltage when the jumper cables are disconnected, thereby eliminating a path for the current which is produced by the generator/alternator, as the generator regulator is generally unable to instantaneously reduce that current. Another example of load dump is when a generator is running at full current to charge the battery and a battery connection becomes momentarily disconnected due to mechanical vibration. The result is an increased voltage similar to the jump start situation as described above. Voltages in excess of maximum operating voltages, such as those that occur during load dump, can be highly damaging to an unprotected circuit.

In an attempt to overcome this problem, a protection circuit is used to either block the voltage from reaching the circuitry, or regulate the supply voltage to a level that is acceptable for the particular circuit being protected. Typically, the protection circuit dissipates power in semiconductor devices, such as Zener diodes. However, this type of semiconductor device has a current that rises in proportion with the battery bus voltage, causing a very high power dissipation which raises the temperature of the semiconductor device. Typically a semiconductor device has a maximum junction temperature less than 200 degrees Celsius. Junction temperatures that exceed this maximum may result in damage to the device, or cause the semiconductor device to fail. Transient voltages exceeding a maximum voltage limit may require power to be dissipated that will threaten to exceed this maximum junction temperature, thereby causing permanent damage to not only the semiconductor devices, but to the circuitry the semiconductor devices are designed to protect.

For some overvoltage conditions, power dissipation in semiconductors is a viable solution. However, when the energy to be dissipated becomes large, the cost of this method increases as the size of semiconductor device or the number of devices necessary to accommodate the energy dissipation also increases.

Another method for power dissipation uses a switched resistor load in which a much higher temperature is tolerated. However, when the switch is opened, the battery bus system voltage is allowed to rise to a level that may be destructive. Furthermore, when the switch remains closed for a long period of time in order to ensure that the voltage has dropped to an appropriate level, excessive power dissipation occurs in the circuit, which may lead to potential damage.

There is a need for a method of dealing with overvoltage conditions without exceeding an allowed temperature for devices in the protection circuit in a cost effective manner.

SUMMARY OF THE INVENTION

The present invention provides an overvoltage protection circuit including a control circuit and a bank of resistors to absorb the energy from a transient voltage without exceeding an allowed temperature for the resistors. The resistors in the bank are independently switched and configured such that upon detection of an overvoltage condition a combination of the resistors is switched into the circuit to dissipate energy. The resistance introduced by the combination of resistors prevents the voltage from rising to an unacceptable level that may damage the circuit being protected. As time progresses, the control circuit alters the combination of resistors in the bank of resistors so as to increase the effective load resistance value, thereby decreasing a load current. When the transient overvoltage has passed, the bank of resistors is switched "off".

The invention monitors for an overvoltage condition and controls the bank of resistors to ensure that switches in the bank of resistors are "on" as necessary to prevent the overvoltage condition from reaching a potentially damaging level. An advantage of the present invention is that, unlike semiconductor material such as silicon, resistors have a much higher allowable temperature and will dissipate higher levels of energy more effectively and more reliably in comparison to silicon devices. Another advantage is that control of the resistor bank ensures that the combination of resistors connected is effectively controlling a voltage within a safe operating level for a circuit being protected. Yet another advantage is the invention provides a widely adjustable and precisely controlled voltage range that is available to protect circuit elements. Still another advantage is that sequencing through a combination of resistors according to the invention allows flexibility in a resolution of the voltage control range in that increasing the number of resistors available for combining increases the resolution of the voltage control range.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF THE INVENTION

Figure 1:
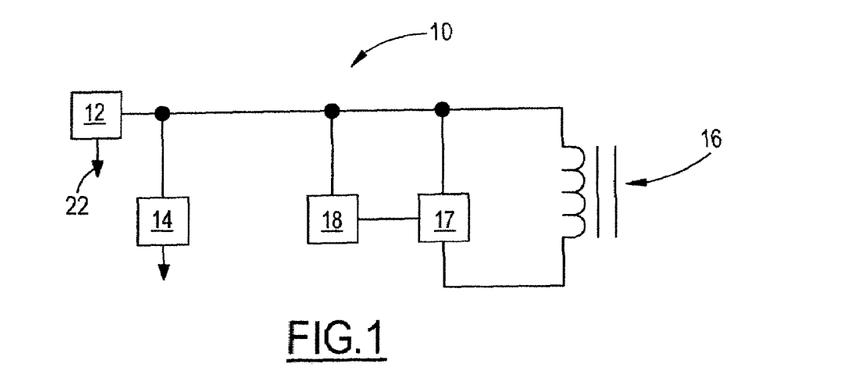
FIG. 1 is a schematic diagram of a vehicle battery bus system.

FIG. 1 is a schematic diagram of a model of a battery bus system 10 for an automotive electrical environment that would be subject to a protection circuit such as the load dump suppression control system and method of the present invention. An alternator 12 and a battery 14 are connected to each other and a protection circuit 18 for protecting sensitive control electronics 17 and a load 16. During load dump, the battery bus voltage, $V_{bat}$, will peak above its normal range, and without protection, permanent damage may occur to the sensitive electronics 17 and load 16.

Figure 2:
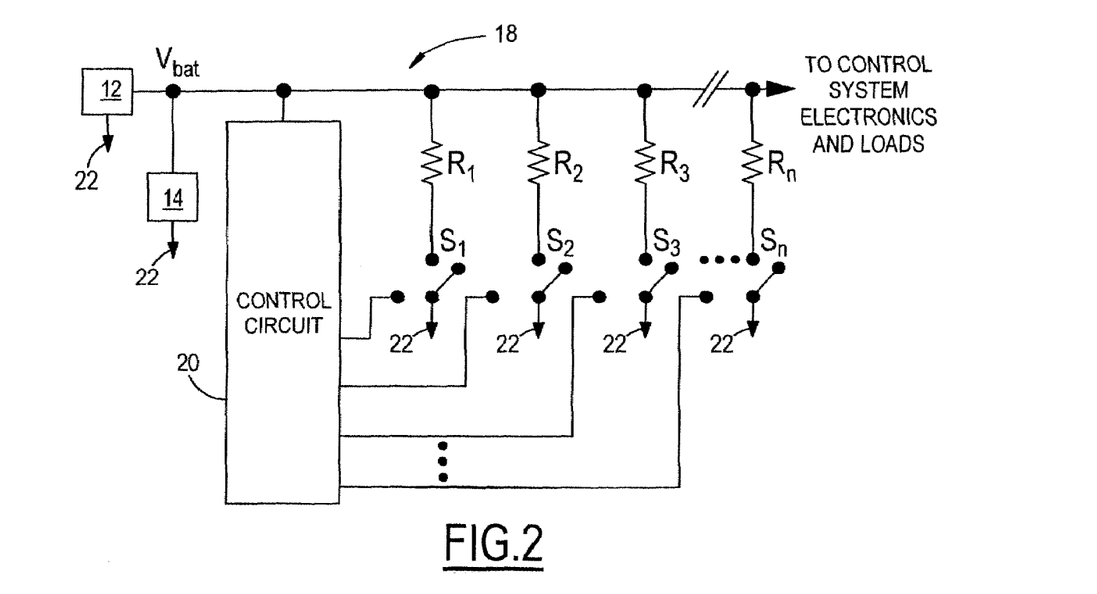
FIG. 2 is a schematic diagram of an embodiment of the invention.

FIG. 2 shows an embodiment of the protection circuit 18 of the present invention as it would be applied in the circuit of FIG. 1. The protection circuit 18 has a control circuit 20 controlling a plurality of resistors, R1, R2, R3, through Rn. The resistors R1 through Rn are configured such that each resistor has a switch S1, S2, S3, through Sn, in order to independently adjust a combination of the resistors R1 through Rn that are switched into the circuit at any time, thereby adjusting the effective load resistance value which will dissipate power and absorb the energy without exceeding an allowed operating temperature of the resistor devices. Each resistor, R1-Rn, and switch, S1-Sn, combination is connected between the battery bus voltage, $V_{bat}$ and ground 22. The effective resistive load is the combination of the resistors which are switched into and out of the circuit at any moment during a count cycle.

The control circuit 20 detects an overvoltage occurrence, such as load dump, and switches in all of the resistors R1-Rn thereby providing a load to match the associated transient event. The load introduced by the control circuit 20 prevents the vehicle's battery bus system voltage from rising to a destructive level. It should be noted that the protection circuit 18 does not interrupt the voltage from the battery and it allows the sensitive electronics and the load to continue operating during the transient overvoltage occurrence. As time progresses the control circuit 20 changes the effective load resistance value by altering the combination of resistors R1-Rn that are switched either "on" or "off". As the load current decreases, the effective load resistance value increases and when the transient overvoltage has passed, the control circuit 20 controls the switches S1-Sn such that all of the resistors R1-Rn are switched out of the circuit. The system effectively controls the battery bus voltage between two threshold levels and provides a large range of resistance values to closely match the required load for a specific transient condition.

The power dissipated according to the present invention is primarily handled in the resistors R1-Rn, which are less costly and not as sensitive to temperature as semiconductor devices. Furthermore, the use of resistors in the present invention makes the circuit robust and therefore it is especially suited for high power load dump specifications, such as 24 Volt systems that have a potential for a load dump peak voltage on the order of 200 Volts. The switched resistor load of the present invention tolerates a much higher temperature in comparison to semiconductor devices, and still prevents the battery bus system voltage from rising to a level which may be destructive. The tuning of the voltage, based on the combination of resistors switched in and out maintains continuous operation of the electronics and load during the transient event.

Figure 3:
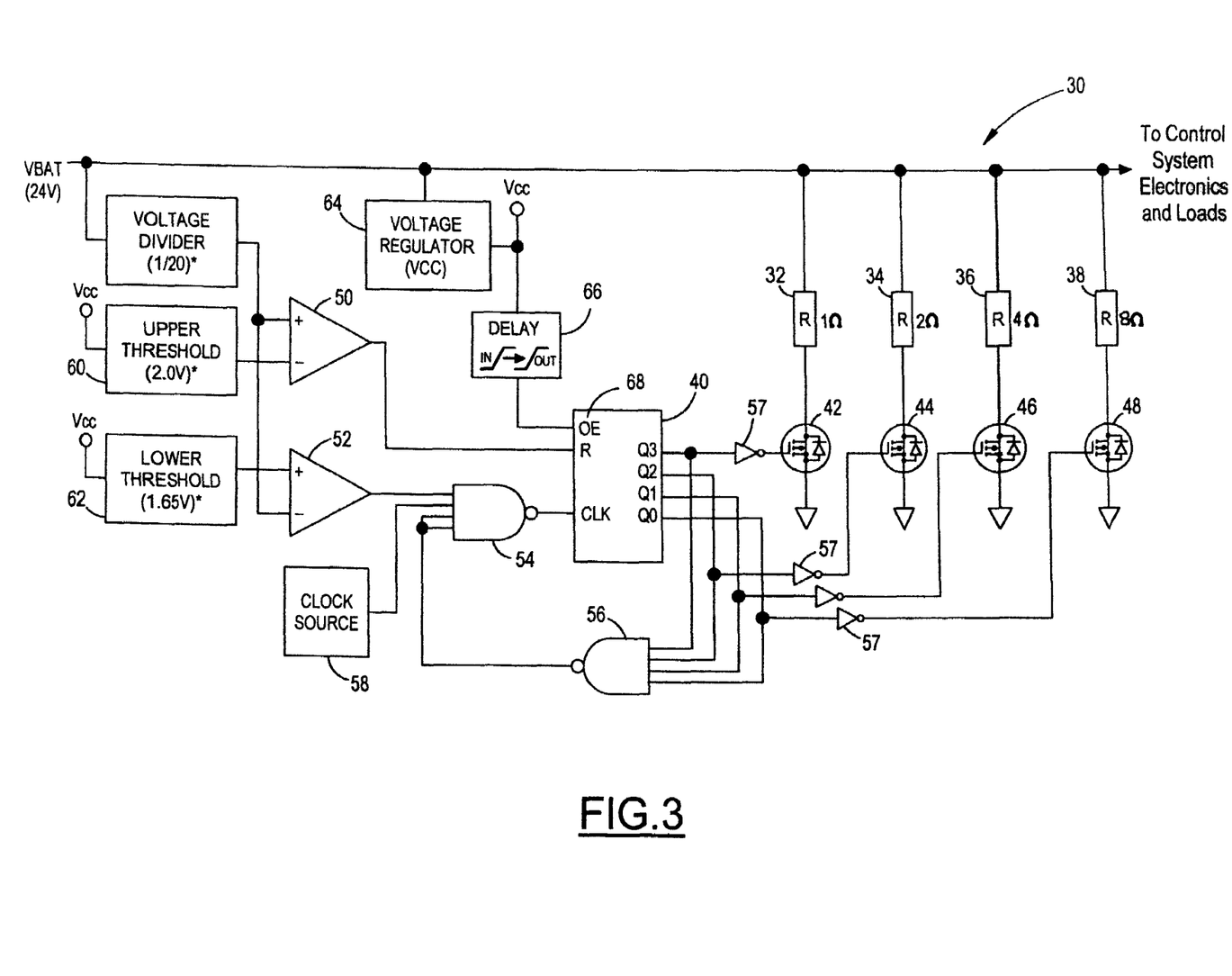
FIG. 3 is a schematic diagram of another embodiment of the invention having a logic control system.

The control circuit 20 may be a microcontroller with appropriate embedded control software. In the alternative, the protection circuit 30 can be realized as in the embodiment shown in FIG. 3 using logic. The embodiment shown in FIG. 3 has four resistors 32, 34, 36, 38 and four switches 42, 44, 46, 48 for example purposes only. A counter 40 controls the switches 42, 44, 46, 48 to add or remove resistors 32, 34, 36, 38 as a count progresses. The counter 40 shown in FIG. 3 is a 4-bit binary counter because there are four resistors and four switches in this particular example. The number of switched resistors may be different in which case, the bit count of the binary counter will change accordingly. First and second comparators 50, 52, first and second NAND gates 54, 56 and a clock source 58 monitor the battery bus voltage, detect an overvoltage condition and control the switches to affect resistor combinations as needed in order to maintain the voltage within threshold limits.

In the logic embodiment shown in FIG. 3, all of the switches 42, 44, 46, 48 are "off" upon start-up and the counter is initialized such that outputs Q0, Q1, Q2, and Q3 are all set to one. The first comparator 50 detects any occurrence of an overvoltage condition. An upper threshold voltage 60 is compared to the voltage detected by the first comparator 50 from the battery, $V_{bat}$, and in the event the battery bus voltage exceeds the upper threshold 60, the counter 40 is set such that all of the switches 42, 44, 46, 48 are turned "on", meaning Q0-Q3 are set to zeros. The second comparator 52 detects when the battery bus voltage is lower than a lower threshold voltage 62 and increments the counter 40 when the battery bus voltage falls to the lower threshold 62. The protection circuit 30 maintains the voltage within the upper and lower threshold limits, while continuously operating the circuit.

The NAND gates 54,56 are arranged such that the counter will count as long as the voltage detected at the second comparator 52 is lower than the lower threshold 62 and the count is not all ones. When a predetermined count is reached, the counter 40 stops counting and all of the resistors 32, 34, 36, 38 will have been switched out of the circuit. The predetermined count in the present example would be all ones in the 4-bit binary counter, or fifteen. The protection circuit of the present invention runs in real time and continuously monitors the battery bus voltage. Therefore, once counting is disabled, the counter remains set at the predetermined count until another transient occurs, at which time, the procedure is repeated.

While semiconductor switches 42, 44, 46, and 48 are shown in the circuit of FIG. 3, their function is to combine the four resistors as necessary according to the control logic. These semiconductor switches are not intended to dissipate the bulk of the power in a linear operating mode. Rather, they are operated in a saturated, or fully-enhanced, mode where the power dissipated, when the switch is "on", is approximated by the square of the current times the drain-to-source "on" resistance, ($RDS_{on}$) for each switch. For example, the $RDS_{on}$ for the switch 42, 44, 46, 48 may be two orders of magnitude smaller than the resistor 32, 34, 36, 38 it is switching. Therefore, the semiconductor switches are not subject to the power dissipation experienced by semiconductor devices used to dissipate power in traditional overvoltage protection circuits.

The protection circuit 30 controls the battery bus voltage, $V_{bat}$, to a level below a maximum safe value. The threshold values may be between a maximum DC system voltage and a safe maximum operating voltage for transistors and integrated circuits. The lower threshold 62 is set to a value above a normal maximum DC applied voltage. An example of the threshold range may be between 36 volts (which is the DC voltage when jump-starting a vehicle having a nominal 24 Volt system with a 36 volt external battery pack) and approximately 50 Volts, which is a safe maximum operating voltage for many transistors and integrated circuits.

A voltage regulator 64 and a delay block 66 may be provided at an Output Enable 68 on the counter 40. Upon power up of the counter, the delay block 66 is applied to the Output Enable 68 to ensure that all of the switches 42, 44, 46, 48 remain "off" for a short time upon start-up of the sequence. For example, at every ignition key cycle, the voltage regulator 64 and delay block 66 ensure that the switches remain "off" until the counter can count to its appropriate value, (fifteen for the embodiment shown in FIG. 3). Introducing the resistors when no transient suppression is required, such as at every ignition key cycle, could be detrimental. The delay introduced by the voltage regulator 64 and block delay 66 ensures that upon initialization, this does not accidentally occur.

The resistors in the embodiment shown in FIG. 3 are a two-to-one ratio of resistors 32, 34, 36, 38 arranged such that output Q0 affects the highest resistance value, 8 Ohms for resistor 38. The counter sequences the resistor values such that the resistance and a voltage divider ratio are provided for each count. Again, it should be noted that while FIG. 3 shows four resistors and four switches, the number of resistors and switches may be increased or decreased as needed for a specific system. It should also be noted that the resistors range in value from 1 Ohm to 8 Ohms in a 2:1 ratio. The values in the embodiment shown in FIG. 3 are not intended to limit the present invention in any way and are shown for example purposes only. The 2:1 ratio for resistor values in the resistor bank decreases the current by 25 Amps for each step of the counter.

Figure 4:
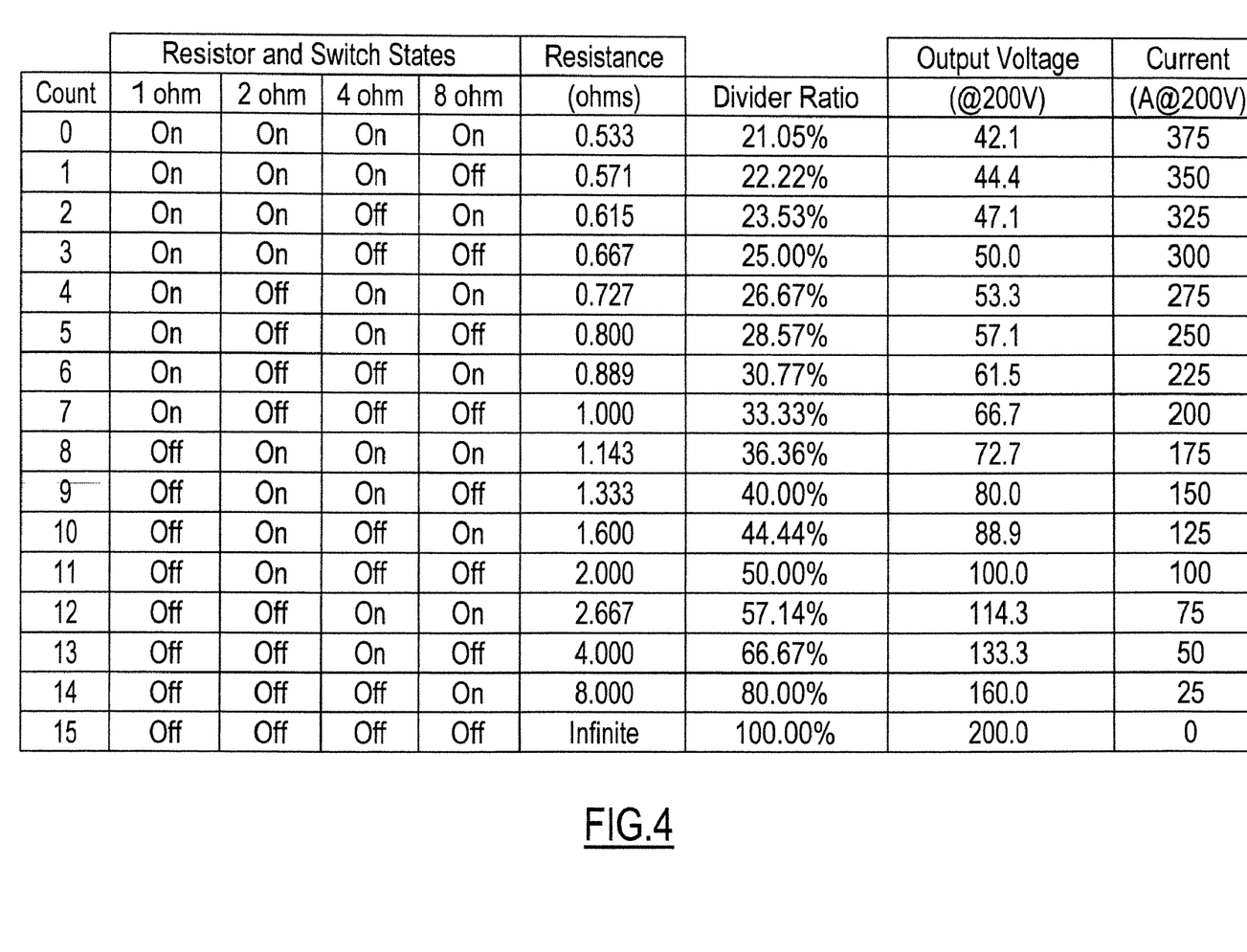
FIG. 4 is a table of count values, resistance values, divider ratios according to the embodiment of the present invention shown in FIG. 3.

FIG. 4 is a table of values for the logic embodiment and resistor values shown in FIG. 3. The count begins with the counter set to all zeros and increments to fifteen. The resistor and switch states are shown along with the effective resistance. The output voltage and the current values in FIG. 4 are presented as if the load dump transient voltage were to remain at 200V for the duration of the count, the output voltage and current values shown would occur. The current steadily decreases by 25 Amps for each count. The table shows the output as a step function approximation of linear load current. However, it should be noted that the voltage transient is not actually constant and should, in fact, decrease over time.

Figure 5:
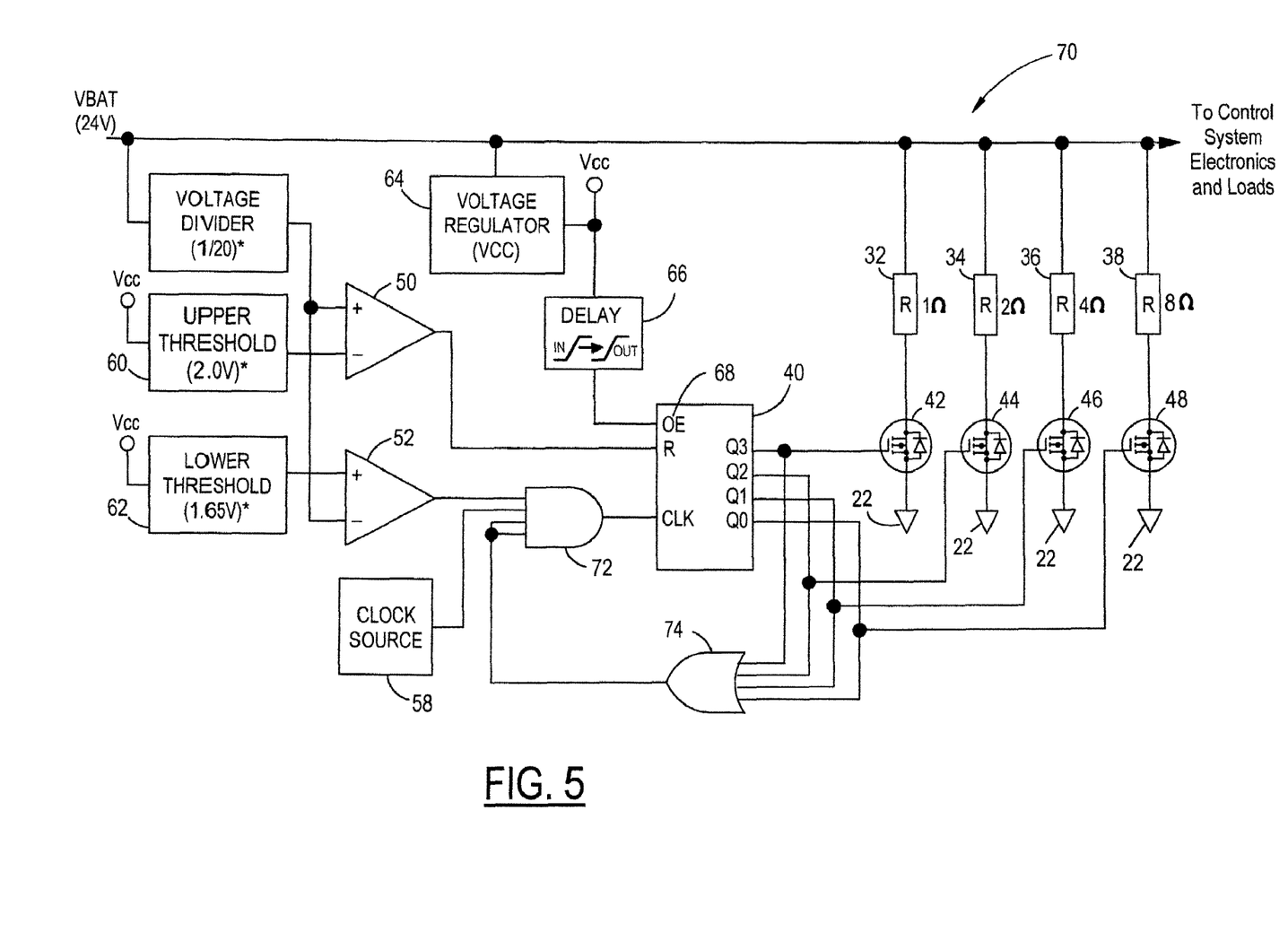
FIG. 5 is a schematic diagram of yet another embodiment of the invention having a logic control system.

FIG. 5 shows an embodiment of the present invention that utilizes a different logic format than the logic applied in the embodiment shown in FIG. 3. Like elements are reflected by like reference numbers in FIGS. 3 and 5. The embodiment shown in FIG. 3 uses NAND gates 54, 56 and inverters 57. In contrast, the embodiment shown in FIG. 5 uses an AND gate 72 and an OR gate 74 and does not employ inverters between the counter 40 and the switches 42, 44, 46 and 48. The operation of the circuit is very similar to the circuit of FIG. 3, however, the output enable 68 clears Q0-Q3 to all zeros upon start up. Another distinction is that a voltage in excess of the upper threshold limit resets the counter to all ones. The counter 40 decrements one count per negative transition of its clock (CLK) input.

The operation of the protection circuit 70 in FIG. 5 is very similar to the embodiment of FIG. 3. For the embodiment shown in FIG. 5, the counter 40 counts as long as the battery bus voltage, $V_{bat}$ is less than the lower threshold voltage 62 and the count is not equal to a predetermined count. In this embodiment, the predetermined count is zero. Therefore, the voltage regulator 64 and block 66 ensure that all four switches remain "off" until the counter can count to its predetermined value of zero in this case.

Regardless of the logic embodiment, the 4-bit binary counter and four switches shown in the embodiments of FIGS. 3 and 5 will result in a maximum count of 15. Should additional resistors and switches be used in the protection circuit of the present invention, each additional switch will add a factor of 2 to the counter.

Figures 6, 7:
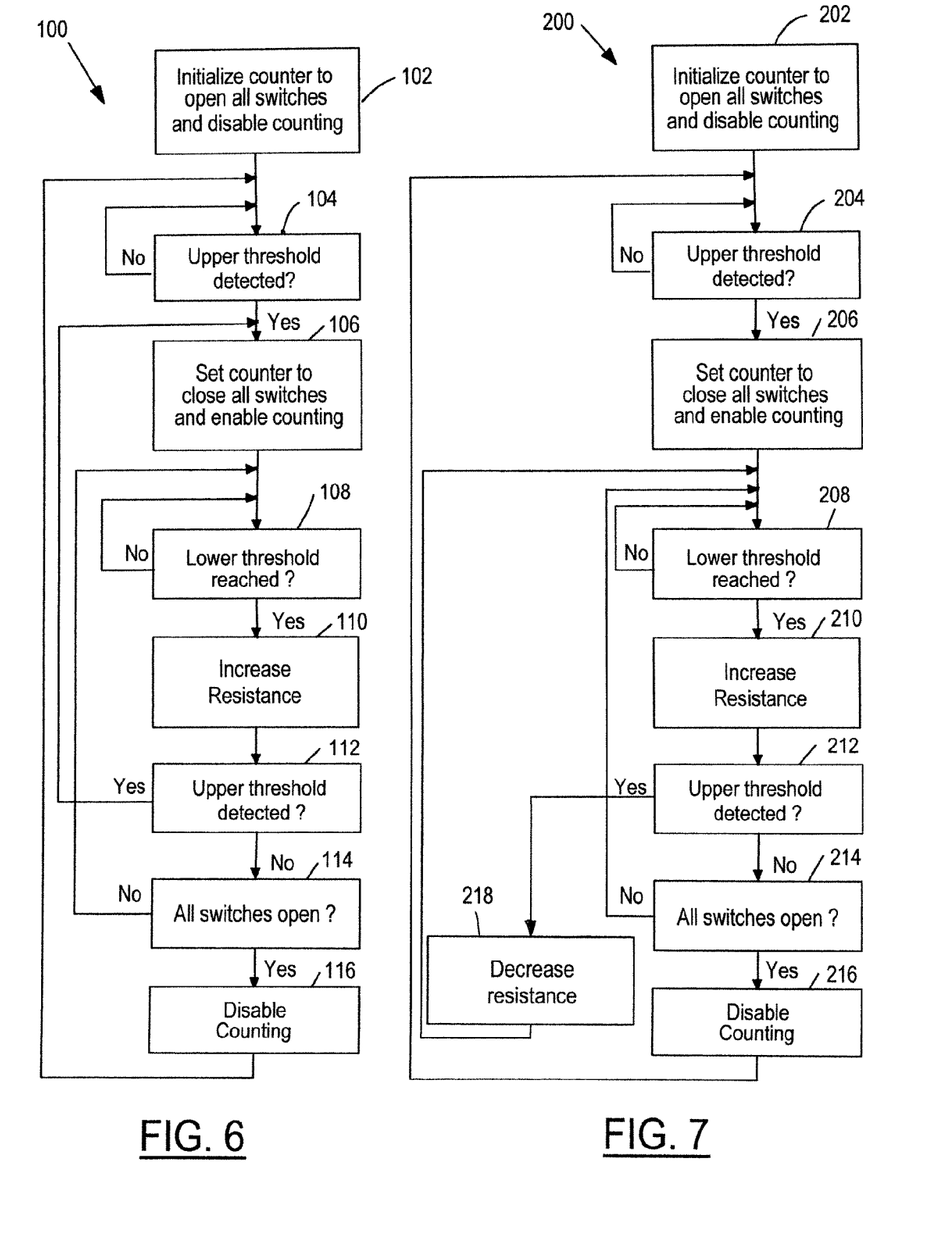
FIG. 6 is a flow chart of a method of the present invention.
FIG. 7 is a flow chart of another embodiment of the method of the present invention.

Referring to FIG. 6, upon start-up, a method 100 initializes 102 the counter. such that all of the switches are "off". For the embodiment shown in FIG. 3, the counter is set to fifteen. For the embodiment shown in FIG. 5, the counter is set to zero. Referring again to FIG. 6, the protection circuit waits in this initialized state until a point in time when the first comparator detects 104 an overvoltage condition. The comparator detects 104 the overvoltage by comparing the battery bus voltage $V_{bat}$ to an upper threshold value. If no load dump overvoltage condition is detected, the switches remain "off". Upon detection of the overvoltage condition, the counter is set 106 to close all the switches such that they are "on" and all of the resistors are introduced into the protection circuit as being effectively added to the load. For the embodiment shown in FIG. 3 the initial count is set to zero and for the embodiment shown in FIG. 5 the initial count is set to fifteen.

Again, the protection circuit monitors the voltage until the second comparator detects 108 that the battery bus voltage has reached a lower threshold value. The comparator detects 108 the voltage has reached the lower threshold value by comparing the detected battery bus voltage with the lower threshold value. Upon detection that the lower threshold has been met, the counter is incremented 110 by a count of one, thereby increasing the resistance. The method 100 is constantly monitoring the voltage in order to maintain the voltage between the upper and lower threshold limits. Therefore, upon detection 112 of a voltage in excess of the upper threshold value at any point in time during the count, the counter will be reset to close all the switches and enable counting. Upon the counter reaching 114 a predetermined count, (fifteen for the embodiment shown in FIG. 3 and zero for the embodiment shown in FIG. 4), counting is disabled 116 and the switches have all been re-opened at this point bringing the protection circuit back to its initialized state. The protection circuit then continues to monitor $V_{bat}$ and waits until a battery bus voltage above the upper threshold is detected 104.

FIG. 7 is another embodiment of the method 200 of the present invention in which the counter is either incremented or decremented depending on the detected battery bus voltage level. Upon start-up, the method 200 initializes 202 the counter such that all of the switches are "off". For the embodiment shown in FIG. 3, the counter is set to fifteen. For the embodiment shown in FIG. 5, the counter is set to zero. Referring again to FIG. 7, the protection circuit waits in this initialized state until a point in time when the first comparator detects 204 a battery bus voltage that exceeds an upper threshold voltage, meaning an overvoltage condition has occurred. The comparator detects 204 the overvoltage by comparing the battery bus voltage $V_{bat}$ to an upper threshold value. If no load dump overvoltage condition is detected, the switches remain "off". Upon detection of the overvoltage condition, the counter is set 206 to close all the switches such that they are "on" and all of the resistors are introduced into the protection circuit as being effectively added to the load. For the embodiment shown in FIG. 3 the count is set to zero and for the embodiment shown in FIG. 5 the count is set to fifteen.

Again, the protection circuit monitors the battery bus voltage until the second comparator detects 208 a battery bus voltage at a lower threshold value. The comparator detects 208 the lower threshold voltage has been reached by comparing the detected battery bus voltage with a lower threshold voltage value. Upon detection that the lower threshold has been met, resistance is increased 210. For the embodiment shown in FIG. 3, the counter is incremented 210 by a count of one and for the embodiment shown in FIG. 5, the counter is decremented by one. The method 200 is constantly monitoring the voltage in order to maintain the voltage between the upper and lower threshold values. Therefore, upon detection 212 of a voltage in excess of the upper threshold value at any point in the count, the resistance will be decreased 218. For the embodiment shown in FIG. 3, the counter is decremented one and for the embodiment shown in FIG. 4, the counter is incremented by one. According to the method 200 shown in FIG. 7, the detection of a battery bus voltage in excess of the upper threshold value will not reset the counter to its initial state. Instead, the counter is adjusted to increase or decrease the resistance as necessary.

In the event, the detected battery bus voltage remains between the upper and lower threshold values, the method determines 214 if the count has reached the point where all of the switches are open. If the count has not been met, the method 200 continues to monitor the battery bus voltage.

The advantages of the present invention make it particularly suited for high power load dump specifications where prior art methods are insufficient. For example, the present invention provides protection for 24 Volt systems that have 200 Volt load dump peak voltage. The independently switched resistors provide widely adjustable and precise control of the effective voltage range. The resolution of the voltage control range may be increased or decreased as needed for a specific system by either increasing or decreasing the number of resistors and switches used.

Figure 8:
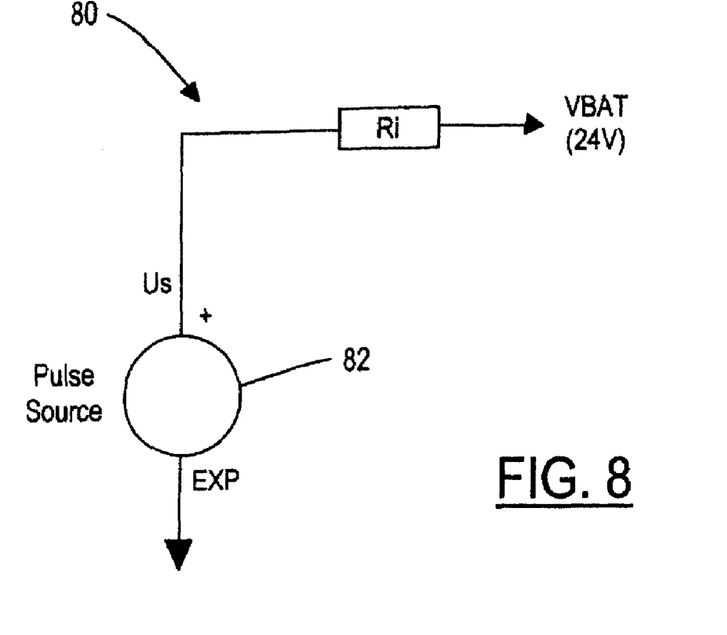
FIG. 8 is an overvoltage simulation circuit.
Figure 9:
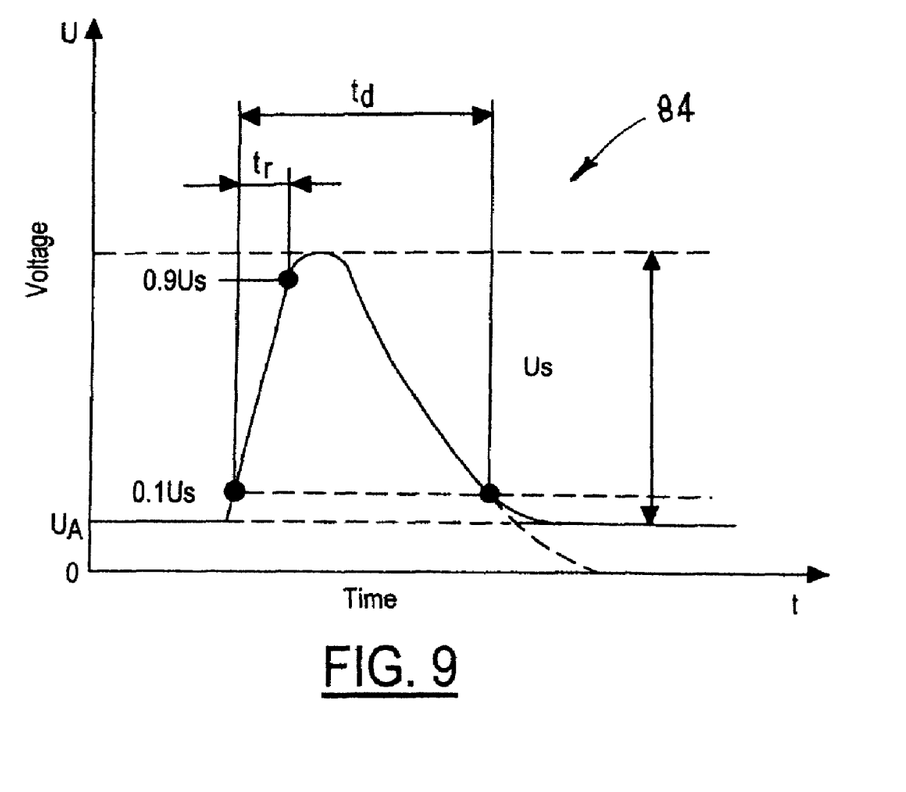
FIG. 9 is graph of ISO standards for the overvoltage simulation circuit of FIG. 8.

FIG. 8 is a load dump simulation circuit 80 with an internal resistance, $R_i$ in Ohms, and a pulse source 82 which are configured to simulate load dump in a vehicle's battery bus system. FIG. 9 is a sample pulse produced by the simulation circuit 80 and the curve 84 shows the voltage, U simulated over time, t. The simulation circuit is created in accordance with standard ISO specifications, Test Pulse 5a from ISO 7637-2:2004(E), which is a standard transient for load dump characteristics used in testing. Table 1 illustrates the parameters and their values for a 12 Volt battery system and a 24 Volt battery system. The curve 84 shown in FIG. 9 is an ISO standard such that each circuit can be tuned and designed for simulation of load dump.

TABLE 1

| Parameter | 12 V System | 24 V System |
|---|---|---|
| $U_s$ | 65 V to 87 V | 123 V to 174 V |
| $R_i$ | 0.5 Ω to 4 Ω | 1 Ω to 8 Ω |
| $t_d$ | 40 ms to 400 ms | 100 ms to 350 ms |
| $t_r$ | (10 +0, −5) ms | |

Figure 10:
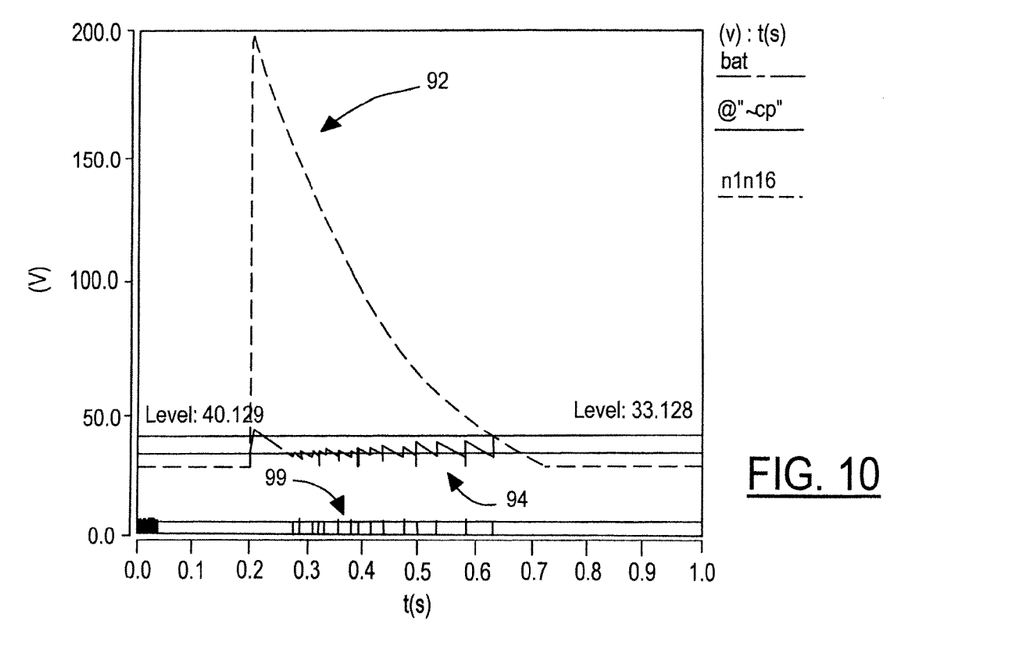
FIG. 10 is a graph of a simulated overvoltage test for the overvoltage protection circuit of the embodiment shown in FIG. 3.

FIG. 10 is a graph illustrating the entire simulation of a load dump event as applied to the embodiment of the protection circuit shown in FIG. 3 and the method 100 described in conjunction with FIG. 6. The transient voltage curve 92 spikes at 200V and lasts for approximately 0.5 seconds. The battery bus voltage transient 92 is simulated in accordance with ISO standards and the simulation circuit of FIG. 8 and Table 1 as it applies to a 24 Volt battery system. Referring back to FIG. 10, the battery bus voltage curve 94 demonstrates that the battery bus voltage, $V_{bat}$ is maintained to a level below a maximum safe value. Fifteen pulses can be identified on the clock signal curve 99 during the transient that correspond to the counter output changing from zero at the beginning of the load dump and fifteen by the transient end.

Figure 11:
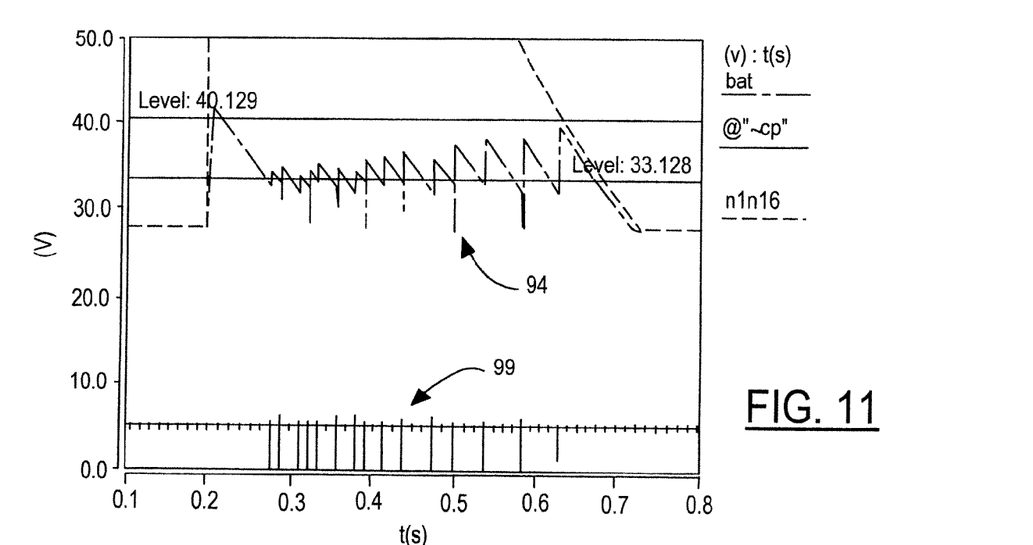
FIG. 11 is a close-up view of an area of interest from the graph in FIG. 10.

FIG. 11 is a close-up view of a primary area of interest in FIG. 10. Specifically, the area of interest is the battery bus voltage between the threshold values for the time length of the voltage transient. The transient, shown as curve 92, lasts for approximately 0.5 seconds and the battery bus voltage is maintained to a level below a maximum safe value. The curve 94 more clearly shows the battery bus voltage at the spike and the battery bus voltage as it is subject to overvoltage protection according to the present invention. The fifteen pulses in the clock signal 99 are clearly defined in FIG. 11 as well.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A system for overvoltage protection comprising:
   a controller for detecting a voltage in excess of an upper threshold voltage value and a voltage less than a lower threshold voltage value, the controller comprising a logic circuit;
   a plurality of switches independently controlled by the control circuit; and
   a plurality of resistors configured to define a load resistance, each resistor in the plurality of resistors being connected to a corresponding switch in the plurality of switches whereby each resistor in the plurality of resistors is connected by its corresponding switch to combine in a manner directed by the control circuit that defines the load resistance necessary to maintain a voltage to a level below a maximum safe value;
   wherein the logic circuit comprises:
   a voltage to be monitored;
   a first comparator having a first input receiving the voltage to be monitored and a second input receiving the upper threshold voltage value, the first comparator providing an upper threshold voltage detected signal upon detecting a voltage in excess of the upper threshold voltage value;
   a second comparator having a first input receiving the voltage to be monitored and a second input receiving the lower threshold voltage value, the second comparator providing a lower threshold voltage detected signal upon detecting a voltage below the lower threshold voltage value;
   a binary counter having a reset input, a clock input and a plurality of counter outputs, each output in the plurality of outputs corresponding to each switch in the plurality of switches; and
   logic control circuitry having an input receiving the lower threshold voltage signal, an input from a clock source and an input representing a present count, the logic control circuitry having an output to the binary counter clock input;
   wherein the binary counter is set to an initial count upon receiving the upper threshold voltage detected signal at the reset input, the initial count closes all of the switches in the plurality of switches, thereby decreasing the load resistance defined by the plurality of resistors in combination and dissipating power due to the upper threshold value being exceeded;

wherein the binary counter adjusts the present count toward a final count upon receiving the lower threshold voltage signal at the clock input and provides a modified resistor combination for each consecutive count between the initial count and the final count, and wherein upon reaching the final count and all of the switches in the plurality of switches being open, the binary counter stops counting.

2. The system as claimed in claim 1 further comprising a time delay signal provided at an output enable input of the binary counter wherein the time delay signal is introduced to allow the counter to reach the final count upon start-up of the system.

3. The system as claimed in claim 2 wherein the plurality of resistors are configured to have a 2:1 ratio.

4. The system as claimed in claim 3 wherein the plurality of resistors further comprises first, second third and fourth resistors and the binary counter is a four bit binary counter.

5. The system as claimed in claim 3 wherein the initial count is zero and the final count is fifteen.

6. The system as claimed in claim 1 wherein the initial count is zero and the logic control circuitry further comprises:

a first NAND gate having an input from each of the binary counter outputs and an output;

a second NAND gate having an input from the output of the first NAND gate, an input from a clock source, an input from the second comparator; and an output;

wherein the output of the second NAND gate being provided to the clock input of the binary counter.

7. The system as claimed in claim 3 wherein the initial count is fifteen and the final count is zero and the logic control circuitry further comprises:

an OR gate having an input from the outputs of the binary counter and an output;

an AND gate having an input from the output of the OR gate, an input from the clock source, an input from the second comparator and an output;

wherein the output of the AND gate being provided to the clock input of the binary counter.

8. The system as claimed in claim 1 further comprising the binary counter adjusting the present count toward a final count upon receiving the lower threshold voltage detected signal at the clock input.

9. The system as claimed in claim 8 further comprising the binary counter being reset to the initial count upon receiving the upper threshold voltage detected signal at the reset input.

* * * * *

UNITED STATES PATENT AND TRADEMARK OFFICE
CERTIFICATE OF CORRECTION

| | | |
|---|---|---|
| PATENT NO. | : 7,561,394 B2 | Page 1 of 1 |
| APPLICATION NO. | : 11/953482 | |
| DATED | : July 14, 2009 | |
| INVENTOR(S) | : David R. Mulligan et al. | |

It is certified that error appears in the above-identified patent and that said Letters Patent is hereby corrected as shown below:

In The Claims:

Column 9, Line 21, should read as follows: -- resistors further comprises first, second, third and fourth resis- --

Signed and Sealed this

Twenty-fifth Day of August, 2009

David J. Kappos
*Director of the United States Patent and Trademark Office*